United States Patent
Schmale (10) Patent No.: US 7,280,880 B2
(45) Date of Patent: Oct. 9, 2007

(54) MANUFACTURING ANALYSIS USING A PART-PROCESS MATRIX

(76) Inventor: Michael D. Schmale, 5 Plymouth Ct., Washington, IL (US) 61571

( * ) Notice: Subject to any disclaimer, the term of this patent is extended or adjusted under 35 U.S.C. 154(b) by 21 days.

(21) Appl. No.: 11/312,332

(22) Filed: Dec. 21, 2005

(65) Prior Publication Data

US 2007/0142948 A1    Jun. 21, 2007

(51) Int. Cl.
*G06F 19/00* (2006.01)
(52) U.S. Cl. .......................................... 700/97; 700/99
(58) Field of Classification Search ................ 700/97, 700/99, 100, 108, 111; 705/8, 28
See application file for complete search history.

(56) References Cited

U.S. PATENT DOCUMENTS

| | | | |
|---|---|---|---|
| 6,198,980 B1 | 3/2001 | Costanza | |
| 6,594,535 B1 | 7/2003 | Costanza | |
| 6,629,004 B1 | 9/2003 | Ivezic et al. | |
| 6,631,305 B2 | 10/2003 | Newmark | |
| 6,898,472 B2 * | 5/2005 | Crampton et al. | 700/97 |
| 2004/0039625 A1 | 2/2004 | Malnack et al. | |
| 2004/0162745 A1 | 8/2004 | Rodrigue et al. | |

OTHER PUBLICATIONS

Duggan, *Creating Mixed Model Value Streams: Practical Lean Techniques for Building to Demand*, Productivity Press, pp. 31-54 (2002).

* cited by examiner

*Primary Examiner*—Alexander Kosowski
(74) *Attorney, Agent, or Firm*—Finnegan, Henderson, Farabow, Garrett, & Dunn (57) ABSTRACT

A computer readable medium has computer executable instructions for performing a method that includes accessing a part-process matrix containing data associated with a plurality of parts and a plurality of machines of a mixed-model manufacturing system. The method may convert the data from a non-binary to a binary representation and sort the data according to at least one characteristic associated with the plurality of machines. The method also sorts the data according to at least one characteristic associated with the plurality of parts and converts the sorted data back to the non-binary representation. A modified part-process matrix can be generated containing the sorted data associated with the plurality of parts and the plurality of machines of the mixed-model manufacturing system.

24 Claims, 6 Drawing Sheets

|   | A | B | C | D |
|---|---|---|---|---|
| X | CT11 | CT21 | CT31 | CT41 |
| Y | CT12 | CT22 | CT32 | CT42 |
| Z | CT13 | CT23 | CT33 | CT43 |

FIG. 3

|   | B | C | D | A |
|---|---|---|---|---|
| Y | CT22 | CT32 |  |  |
| Z |  |  |  | CT13 |
| X |  |  | CT41 | CT11 |

| | CTL 102 | CTL 103 | STL 110 | STL 111 | STL 113 | CSZ 120 | BVL 121 | TRC 122 | TRC 130 | TTL 131 | BVL 132 | D&P 150 | D&P 153 |
|---|---|---|---|---|---|---|---|---|---|---|---|---|---|
| 1U-1452 | | | | | | | | | | | | | |
| 1U-1470 | 1.25 | 1.68 | 2.13 | 1.59 | | | 1.45 | 2.12 | 1.05 | | 0.34 | 2.81 | 0.34 |
| 1U-1473 | | 3.49 | | | 1.78 | | | 0.98 | 0.71 | | 1.35 | | 1.05 |
| 1U-1475 | | | | 0.53 | | 1.48 | | | | | 6.69 | | |
| 1U-1478 | 1.25 | 1.68 | 2.13 | 1.59 | | | 1.45 | 2.12 | 1.05 | | 0.34 | 2.81 | 0.34 |
| 1U-1479 | | 3.49 | | | 1.78 | | | 0.98 | 0.71 | | 1.35 | | 1.05 |
| 1U-1533 | | | | 0.53 | | 1.48 | | | | | 6.69 | | |
| 3G-4285 | 1.25 | 1.68 | 2.13 | 1.59 | | | 1.45 | 2.12 | 1.05 | | 0.34 | 2.81 | 0.34 |
| 4D-5758 | | 3.49 | | | 1.78 | | | 0.98 | 0.71 | | 1.35 | | 1.05 |
| 4J-8225 | | | | 0.53 | | 1.48 | | | | | 6.69 | | |
| 4J-8226 | 1.25 | 1.68 | 2.13 | 1.59 | | | 1.45 | 2.12 | 1.05 | | 0.34 | 2.81 | 0.34 |
| 4T-2891 | | 3.49 | | | 1.78 | | | 0.98 | 0.71 | | 1.35 | | 1.05 |
| 4T-2894 | | | | 0.53 | | 1.48 | | | | | 6.69 | | |
| 4T-2896 | 1.25 | 1.68 | 2.13 | 1.59 | | | 1.45 | 2.12 | 1.05 | | 0.34 | 2.81 | 0.34 |
| 4T-2899 | | 3.49 | | | 1.78 | | | 0.98 | 0.71 | | 1.35 | | 1.05 |
| 4T-2963 | | | | | | | | | | 5.47 | | | |
| 4T-2964 | | | | 0.53 | | 1.48 | | | | | 6.69 | | |
| 4T-2968 | 1.25 | 1.68 | 2.13 | 1.59 | | | 1.45 | 2.12 | 1.05 | | 0.34 | 2.81 | 0.34 |
| 4T-2976 | | 3.49 | | | 1.78 | | | 0.98 | 0.71 | | 1.35 | | 1.05 |
| 4T-2977 | | | | 0.53 | | 1.48 | | | 0.71 | | 6.69 | | |
| 4T-2978 | 3.49 | | 2.87 | | | | 2.68 | | 17.21 | | | | |
| 4T-2980 | 1.25 | 1.68 | 2.13 | 1.59 | | | | 2.12 | | | 0.34 | 2.81 | |
| 4T-2981 | | 3.49 | 2.13 | | 1.78 | | | 0.98 | | | 1.35 | | 1.05 |
| 4T-3008 | 1.25 | 1.68 | 2.13 | | | | | | | | 6.69 | | 1.05 |
| 4T-3010 | | 3.49 | | 0.53 | 1.78 | 1.48 | | 0.98 | 0.71 | | 6.69 | | |

MANUFACTURING ANALYSIS USING A PART-PROCESS MATRIX

TECHNICAL FIELD

This disclosure relates generally to analyzing manufacturing operations and, more particularly, to analyzing manufacturing operations using a part-process matrix.

BACKGROUND

Manufacturing operations are generally configured to produce parts to satisfy customer demand. As demand for parts may vary, manufacturing operations may better balance the use of manufacturing machines by using each machine to produce a range of parts. Mixed-model manufacturing may refer to manufacturing operations in which different types of parts are produced using various manufacturing machines. Typical mixed-model manufacturing operations may be used to produce parts for various industries, such as, for example, automotive, mining, farming, aeronautical or any other industry requiring production of different parts. Mixed-model manufacturing may be advantageous if different parts require similar processing steps or manufacturing machines can be configured to process multiple parts. Using a single manufacturing machine to process multiple part types can increase machine utilization and decrease inventories of partially manufactured parts, thereby increasing the overall efficiency of the manufacturing operation.

Improving the efficiency of mixed-model manufacturing operations may be complicated. For example, if the number of parts produced or machines used increases, the number of different part routes may increase significantly. Further, changing the type or number of parts produced may create bottlenecks at some manufacturing machines, while leaving other machines under-utilized.

One method for analyzing mixed-model manufacturing includes grouping parts into "families," as described in "Creating Mixed Model Value Streams," by Kevin Duggan, published in 2002. Duggan defines a part family as a group of parts that pass through similar processing steps. Duggan also describes a tabular "part family matrix" that includes data corresponding to the manufacture of specific parts using specific processes. Duggan also provides software to reorganize the matrix to allow a user to visually identify part families. However, there are limitations to the software used to sort and reorganize the matrix. The software provided is limited by the number of parts it can reorganize and may require unacceptably time-consuming computation.

The present disclosure is directed to overcoming one or more of the problems described above.

SUMMARY OF THE INVENTION

One aspect of the present disclosure is directed toward a computer readable medium having computer executable instructions for performing a method including accessing a part-process matrix containing data associated with a plurality of parts and a plurality of machines of a mixed-model manufacturing system. The method includes converting the data from a non-binary to a binary representation and sorting the data according to at least one characteristic associated with the plurality of machines. The method also includes sorting the data according to at least one characteristic associated with the plurality of parts and converting the sorted data back to the non-binary representation. A modified part-process matrix can be generated containing the sorted data associated with the plurality of parts and the plurality of machines of the mixed-model manufacturing system.

Another aspect of the present disclosure is directed to a computational method for analyzing a mixed-model manufacturing system that includes accessing a part-process matrix containing data associated with a plurality of parts and a plurality of machines of the mixed-model manufacturing system. The method includes converting the data from a non-binary to a binary representation and sorting the data according to at least one characteristic associated with the plurality of machines. The data are sorted according to at least one characteristic associated with the plurality of parts and the sorted data may be converted back to the non-binary representation. A modified part-process matrix can be generated containing the sorted data associated with the plurality of parts and the plurality of machines of the mixed-model manufacturing system.

DETAILED DESCRIPTION

Figure 1:
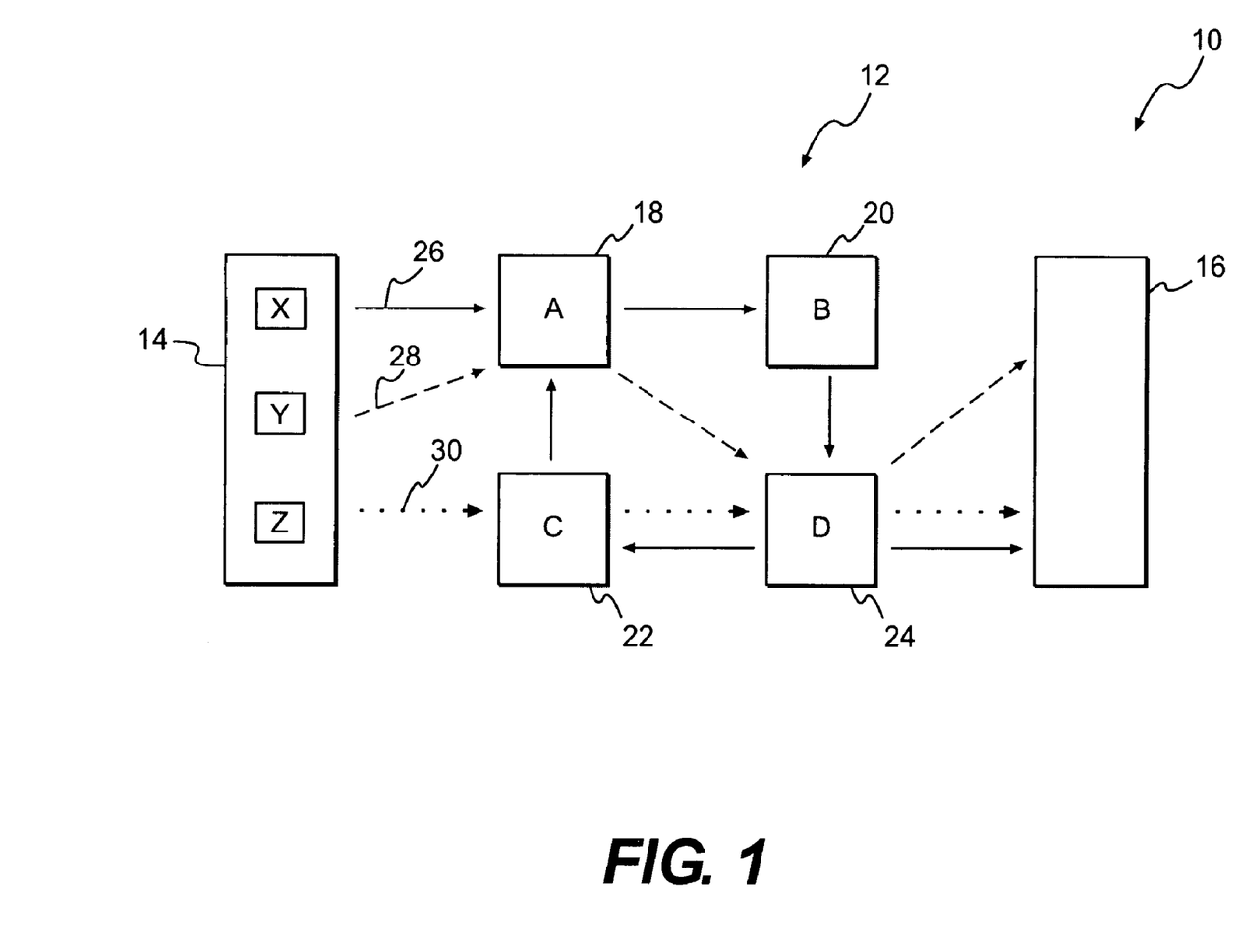
FIG. 1 illustrates a block diagram of a mixed-model manufacturing system according to an exemplary disclosed embodiment.

FIG. 1 illustrates a block diagram of a mixed-model manufacturing system 10, according to an exemplary disclosed embodiment. Mixed-model manufacturing system 10 may include one or more manufacturing machines 12 configured to perform one or more manufacturing processes. Manufacturing machines 12 may perform any manufacturing process required to form one or more finished parts 16 from one or more unfinished parts 14.

In order to improve the efficiency of mixed-model manufacturing system 10, a user may utilize computational methods to analyze the manufacturing operation. For example, some mixed-model manufacturing operations may include large numbers of unfinished parts 14 moving through numerous manufacturing machines 12. In an exemplary embodiment, a part-process matrix may be used to analyze mixed-model manufacturing system 10. Specifically, a part-process matrix may allow a user to identify families of parts or manufacturing machines 12 to analyze and improve the efficiency of mixed-model manufacturing system 10.

Manufacturing machines 12 may include any manufacturing machine known in the art. In some embodiments, manufacturing machines 12 may include one or more individual machines, such as, for example a Machine A 18, a Machine B 20, a Machine C 22, and a Machine D 24. Manufacturing machines 12 may be configured to perform any suitable processing step, such as, for example, drilling, burring, forging, soldering, welding, brazing, cleaning, inspecting, etc.

In some embodiments, manufacturing machines 12 may be defined by one or more processing steps. For example, a machine may be configured to perform a single processing step, such as, drilling, burring, or polishing. Alternatively, an individual machine may be configured to perform multiple processing steps, such as, for example, a drilling machine configured to drill holes of different diameters. As used herein, manufacturing machines 12 may refer to one or more machines and/or processes used to at least partially manufacture one or more parts. In addition, an individual machine may correspond to an individual processing step, wherein a machine may be defined by a process it performs.

Mixed-model manufacturing system 10 may be configured to produce finished parts 16 from unfinished parts 14. Parts may refer to any part, product, or assembly known in the art, such as, for example, a cam, a valve, a brake pad, a hydraulic assembly, etc. As shown in FIG. 1, unfinished parts 14 may include a Part X whose path through system 10 is represented by a solid arrow 26, a Part Y whose path through system 10 is represented by a dashed arrow 28, and a Part Z whose path through system 10 is represented by a dotted arrow 30. It should be noted that although three parts are described, typical mixed-model manufacturing systems 10 may process many more parts at various stages of production. In some embodiments, any number of finished parts 16 may be produced using mixed-model manufacturing systems 10.

Mixed-model manufacturing system 10 may produce finished parts 16 by routing unfinished parts 14 through one or more manufacturing machines 12. In some embodiments, individual parts may be routed through different manufacturing machines 12. For example, as shown in FIG. 1, Part Z may be routed through Machine C 22 and Machine D 24 as shown by path 30. In addition, Part X may be routed through Machine A 18, Machine B 20, and Machine D 24 as shown by path 26. In some embodiments, Part X may be routed one or more times through Machine A 18, Machine B 20, Machine D 24, and Machine C 22 as shown by path 26. For example, Machines 18, 20, 24 and 22 may perform drilling, polishing, inspecting and burring processing steps respectively. These processing steps may be repeated until Part X conforms to a suitable specification, wherein Part X may then be routed to finished parts 16 as shown by path 26.

In some embodiments it may be possible to improve the efficiency of mixed-model manufacturing system 10 by re-routing individual parts from one or more manufacturing machines 12 to one or more different manufacturing machines 12. For example, Machine D 24 is used to process Parts X, Y or Z whereas Machine B 20 is used only to process Part X. Therefore in some situations, Machine B 20 may have unused production capacity and it may be possible to reduce the workload on Machine D 24 by diverting one or more parts to Machine B 20 for processing.

Improving the efficiency of mixed-model manufacturing system 10 by re-routing parts or modifying machine utilization may be possible if the number of parts or machines are limited. However, as the number of parts or machines increase, analysis of mixed-model manufacturing system 10 may become increasingly difficult. For example, as the number of part routing options increases it may become more difficult to identify inefficient part routings that burden some machines, while other machines remain under-utilized. Analysis of mixed-model manufacturing system 10 containing large numbers of parts or machines may require computational methods.

Figure 2:
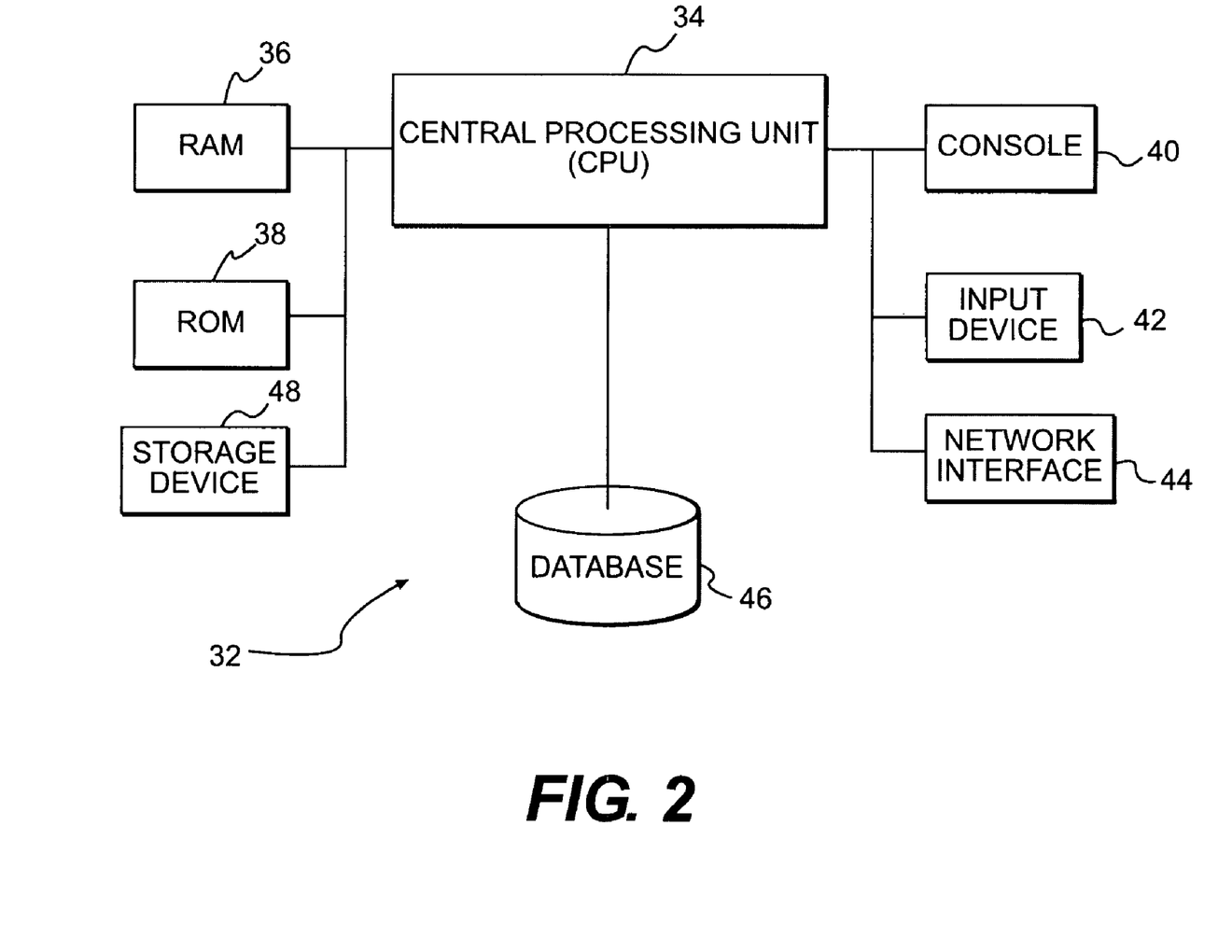
FIG. 2 illustrates a block diagram of a computer system according to an exemplary disclosed embodiment.

FIG. 2 illustrates a block diagram of computer system 32 according to an exemplary disclosed embodiment. Computer system 32 may include a central processing unit (CPU) 34, a random access memory (RAM) 36, a read-only memory (ROM) 38, a console 40, an input device 42, a network interface 44, a database 46, and a storage device 48. It is contemplated that computer system 10 may include additional, fewer, and/or different components than what is listed above. It is understood that the type and number of listed devices are exemplary only and not intended to be limiting.

CPU 34 may include any appropriate type of general purpose microprocessor, digital signal processor or microcontroller. CPU 34 may execute sequences of computer program instructions to perform various processes associated with analyzing mixed-model manufacturing system 10. The computer program instructions may be loaded into RAM 36 for execution by CPU 34 from ROM 38, and/or from storage device 48. Storage device 48 may include any appropriate type of mass storage provided to store information that CPU 34 may need to perform the processes. For example, storage device 38 may include one or more hard disk devices, optical disk devices, or other storage device to provide storage space.

Computer system 32 may interface with a user via console 40, input device 42, and/or network interface 44. In particular, console 40 may provide a graphical user interface (GUI) to display information to users of computer system 32. Console 40 may be any appropriate type of computer display device or computer monitor. Further, input device 42 may be provided for users to input information into computer system 32. Input device 42 may include, for example, a keyboard, a mouse, an optical or wireless computer input device, or any other type of input device. Further, network interface 44 may provide communication connections such that computer system 32 may be accessed remotely through computer networks.

Database 46 may include any type of commercial or customized database configured to store data and any other information related mixed-model manufacturing system 10. Database 46 may also include one or more tools for analyzing the data and other information contained therein. In some embodiments, CPU 34 may use database 46 to store and retrieve data associated with mixed-model manufacturing system 10. Specifically, database 46 may store information associated with mixed-model manufacturing system 10 in a tabular format, such as, for example, a two-dimensional matrix containing part and machine data.

Figure 3:
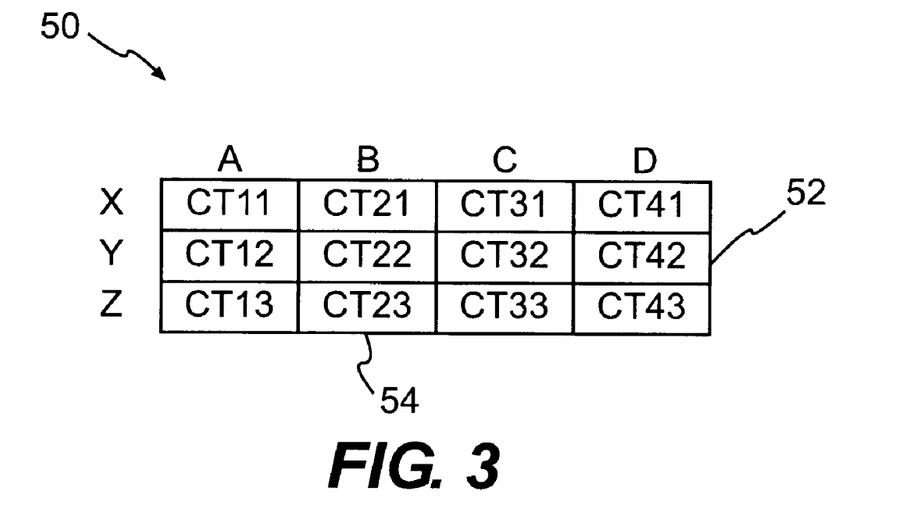
FIG. 3 illustrates a part-process matrix according to an exemplary disclosed embodiment.

FIG. 3 illustrates an exemplary part-process matrix (PPM) 50 of mixed-model manufacturing system 10. In some embodiments, PPM 50 may include a table for storing data associated with mixed-model manufacturing system 10, such as, for example, cycle time, average cycle time, labor time, down time, takt time, operational cycle time, time indexes, part demand, part group, or other suitable data. PPM 50 may include data associated with an individual part, machine and/or processing step of mixed-model manufacturing system 10. For example, data associated with a part may include manufacturing time, cost, weight, material, supplier, customer, or other part information. Data associated with a machine may include manufacturing time, power usage, change-over time, utilization, or other machine information. Further, data associated with a processing step of mixed-model manufacturing system 10 may include process time, cost, energy consumption, employees required, downtime, or other processing information.

In some embodiments, data associated with mixed-model manufacturing system 10 may be stored in one or more cells of PPM 50. As shown in FIG. 3, each cell of PPM 50 may contain data representing the time required to manufacture a specific part using a specific machine, or cycle time (CT). Specifically, PPM 50 may include one or more cells containing data representing the cycle times (CT11-CT43) required to manufacture one or more parts (X, Y, Z) using one or more machines (A, B, C, D). For example, manufacturing Part Y using Machine D may require a cycle time (CT42) stored in a cell 52. Similarly, manufacturing Part Z using Machine B may require a cycle time (CT23) stored in a cell 54. It is also contemplated that cells of PPM 50 may include no data or zero data values. For example, if PPM 50 included data from mixed-model manufacturing system 10 as shown in FIG. 1, CT22 and CT32 may be zero as Part Y that travels along path 28 is not routed through Machine B 20 or Machine C 22.

In some embodiments, PPM 50 may be used to analyze mixed-model manufacturing system 10. For example, PPM 50 may be displayed using console 40, and a user may visually inspect PPM 50 to analyze mixed-model manufacturing system 10. However, visual inspection of PPM 50 may become increasingly difficult as the number of parts or machines increase and console 40 may not provide sufficient area to display PPM 50. One method used to improve visual inspection of PPM 50 may include grouping parts and/or machines into families.

In some embodiments, families of parts or machines may be formed based on similar characteristics of family members. For example, a family of parts may include one or more parts characterized by a similar processing step. In other embodiments, a family of machines may include one or more machines used to process a common part. Following family identification, individual families of parts or machines may be analyzed independent of other families in PPM 50. A user may reduce the quantity of data under consideration at any one time by analyzing the data subset of PPM 50 associated with an individual family. Mixed-model manufacturing system 10 may then be analyzed by analyzing each family of mixed-model manufacturing system 10.

While analysis of individual families of parts or machines may be a useful technique to analyze mixed-model manufacturing system 10, identifying suitable families within PPM 50 may be difficult. Parts or machines sharing similar characteristics may not be readily apparent, and reorganizing the data within PPM 50 may be difficult and time consuming. In order to facilitate family identification using PPM 50, a computational method to reorganize PPM 50 is disclosed.

Figure 4:
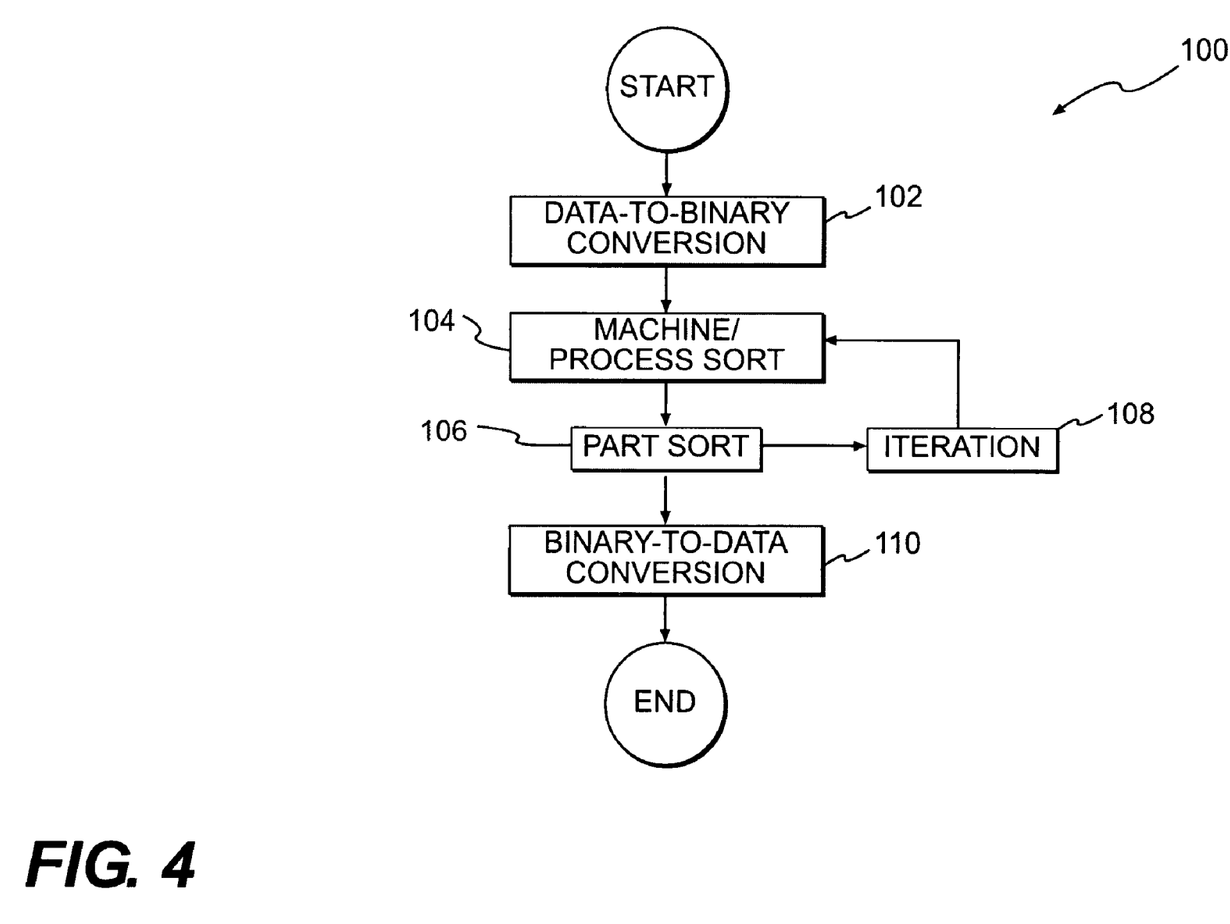
FIG. 4 illustrates a flowchart of an exemplary method for reorganizing a part-process matrix.
Figure 5:
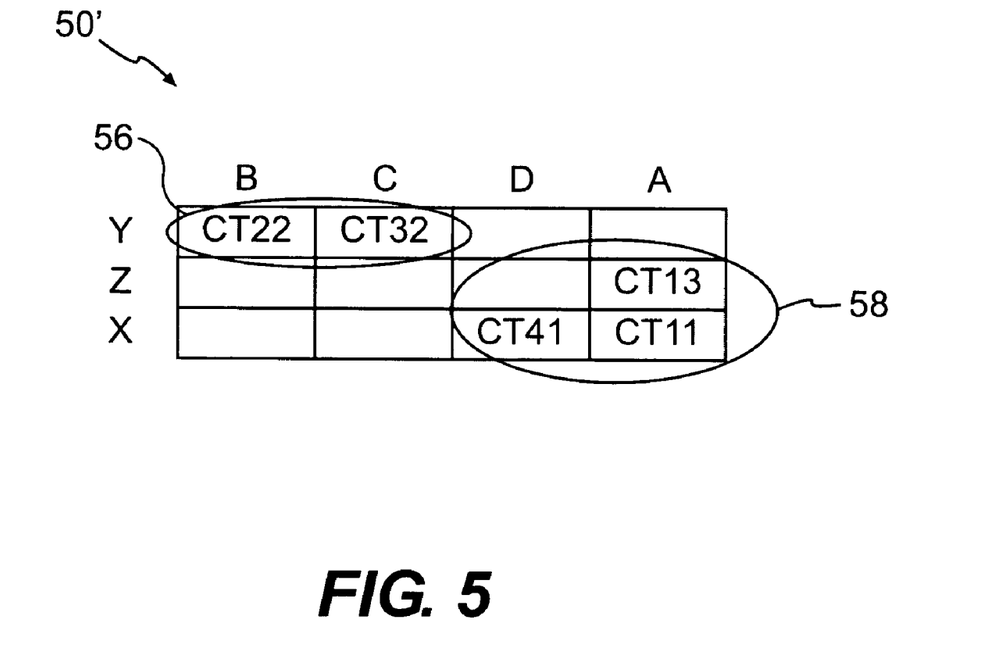
FIG. 5 illustrates a modified part-process matrix according to an exemplary disclosed embodiment.

FIG. 4 illustrates a flowchart 100 of an exemplary method for reorganizing the data of PPM 50 to aid the visual identification of one or more families of parts or machines. For example, flowchart 100 may be used to convert PPM 50, as shown in FIG. 3, into a modified part-process matrix (PPM 50') as shown in FIG. 5, wherein two families 56 and 58 may be identified based on visual inspection of the reorganized data within PPM 50'. Specifically, flow chart 100 may include sorting each column and then sorting each row of PPM 50. These sorting operations may then be repeated any number of times to form PPM 50'.

In some embodiments, the computational method of flow chart 100 may reorganize PPM 50 to form PPM 50' such that families of parts or machines may be identified. Initially, the data contained within the cells of PPM 50 may be converted into binary representations (step 102). Specifically, the cells containing non-zero value data may be converted to a binary representation "1", and cells containing zero value data or containing no information may be converted to a binary representation "0". It is also contemplated that binary representations may include "X" or "O", or any other designations to distinguish non-zero and zero value data of PPM 50.

In some embodiments, the non-zero and zero value data of PPM 50 may be stored for later use. For example, the data of PPM 50 may be stored in another part-process matrix, table, series of vectors, or any other data structure known in the art. The data of PPM 50 may be stored such that the data may be retrieved following the sort of columns and rows of PPM 50.

Following the data-to-binary conversion, the data associated with each machine of PPM 50 may be sorted (step 104). PPM 50 may be mathematically described as an "i×j" matrix of "i" columns representing "i" machines. In some embodiments, each column representing machine "i" may be represented by $$Y_i = [y_1, y_2, y_3, \ldots, y_j],$$

where $y_j$ are cells containing data associated with machine "i" and corresponding part "j". For example, as shown in FIG. 3, PPM 50 may be represented by four columns of Machine A-D, wherein Machine A=[CT11, CT12, CT13], Machine B=[CT21, CT22, CT23], Machine C=[CT31, CT32, CT33], and Machine D=[CT41, CT42, CT43].

In some embodiments, the cells of a column of PPM 50 may be sorted to group cells containing similar data. For example, each column may be sorted in ascending or descending order, such that if $Y_1=[0,1,0,1]$ then following the sort $Y_1=[1,1,0,0]$ or $Y_1=[0,0,1,1]$. The sort of each column may sort all cells of PPM 50 to maintain the association between part "j" and machine "i". Specifically, the sort of one column may re-order the cells within the other columns of PPM 50 to maintain the association between part "j" and the cells corresponding to machine "i". In some embodiments, each column may be sorted such that all columns of PPM 50 are sorted. For example, the columns may be sorted sequentially until all columns of PPM 50 are sorted, forming a modified matrix.

Following the sort of machines (columns of PPM 50), the parts (rows of PPM 50) of the modified matrix may be sorted (step 106). As noted, the modified matrix may be mathematically described as an "i ×j" matrix into "j" rows representing "j" parts. In some embodiments, each row "j" may be represented by $$X_j = [x_1, x_2, x_3, \ldots, x_i],$$

where $x_i$ are cells containing data associated with part "j" and corresponding machine "i". For example, as shown in FIG. 3 row 1 of PPM 50 may represent Part X.

In some embodiments, the cells within each row may be sorted. For example, each row may be sorted in ascending or descending order as described previously for the column sort. The row sort may also maintain the association between machine "i" and part "j". Specifically, the sort of one row may re-order the cells within the other rows of the modified matrix to maintain the association between machine "i" and the cells corresponding to part "j". In some embodiments, each row representing each part may be sorted such that all rows of the modified matrix are sorted. For example, the parts may be sorted sequentially until all rows of the modified matrix are sorted.

Following the sort of parts (rows of PPM 50), the sort of machines (columns of PPM 50) may be repeated. In some embodiments the machine sort may be repeated using a modified matrix formed by the sorted columns and sorted rows as described above. The iteration (step 108) may be repeated until the data is sufficiently sorted, such as, for example i–1 times.

Following completion of the iteration, the data of the modified matrix may be converted from binary representations to the data contained within the cells of PPM 50 (step 110). In some embodiments, the stored data of PPM 50 may be retrieved and inserted into the modified matrix. For example, the data-to-binary conversion (step 102) may be reversed such that the cells having binary representations of "1" may be converted to the non-zero values of the corresponding cells of PPM 50 and the cells having binary representations of "0" may be converted to zero values. Following the computation method as shown by flowchart 100, the data within PPM 50 may be in a reorganized format such that a user may more readily identify part or machine families.

FIG. 5 illustrates PPM 50' according to an exemplary disclosed embodiment. For example, PPM 50' may represent PPM 50 (FIG. 3) following application of flow chart 100 (FIG. 4). PPM 50' may include the data associated with PPM 50 in a reorganized format such that families of parts or machines may be more readily identified. Specifically, the application of flow chart 100 may sort part and machine data to approximately group generally similar parts and/or generally similar machines. As noted above, a user may visually inspect PPM 50' to identify one or more families of parts or machines. Families may then be analyzed independently using manufacturing analysis techniques known in the art. Family analysis may allow a user to analyze a subset of data representing mixed-model manufacturing system 10 rather than attempting to analyze of the entire manufacturing operation.

In some embodiments families may include one or more members, wherein one or more members may share generally similar characteristics. For example, families 56 and 58 may represent groups of parts or machines defined by similar characteristics. As shown in FIG. 5, family 56 may be based on the commonality of Part Y, wherein family 56 may include Machine B and Machine C. In another example, family 58 may include members based on proximity to other members. Specifically, Part X and Part Z may be members of family 58 based on the common processing step performed by Machine A. In addition, Machine D and Machine A may be members of family 58 based on the commonality of Part X.

A user may select a variety of different criteria for grouping one or more parts or machines into families. In some embodiments selection criteria may depend on the subjective assessment of a user. For example, a user may analyze a number of cells of PPM 50' within the vicinity of a potential family, the data contained within cells, part or machine type, or any other suitable selection process.

Figure 6:
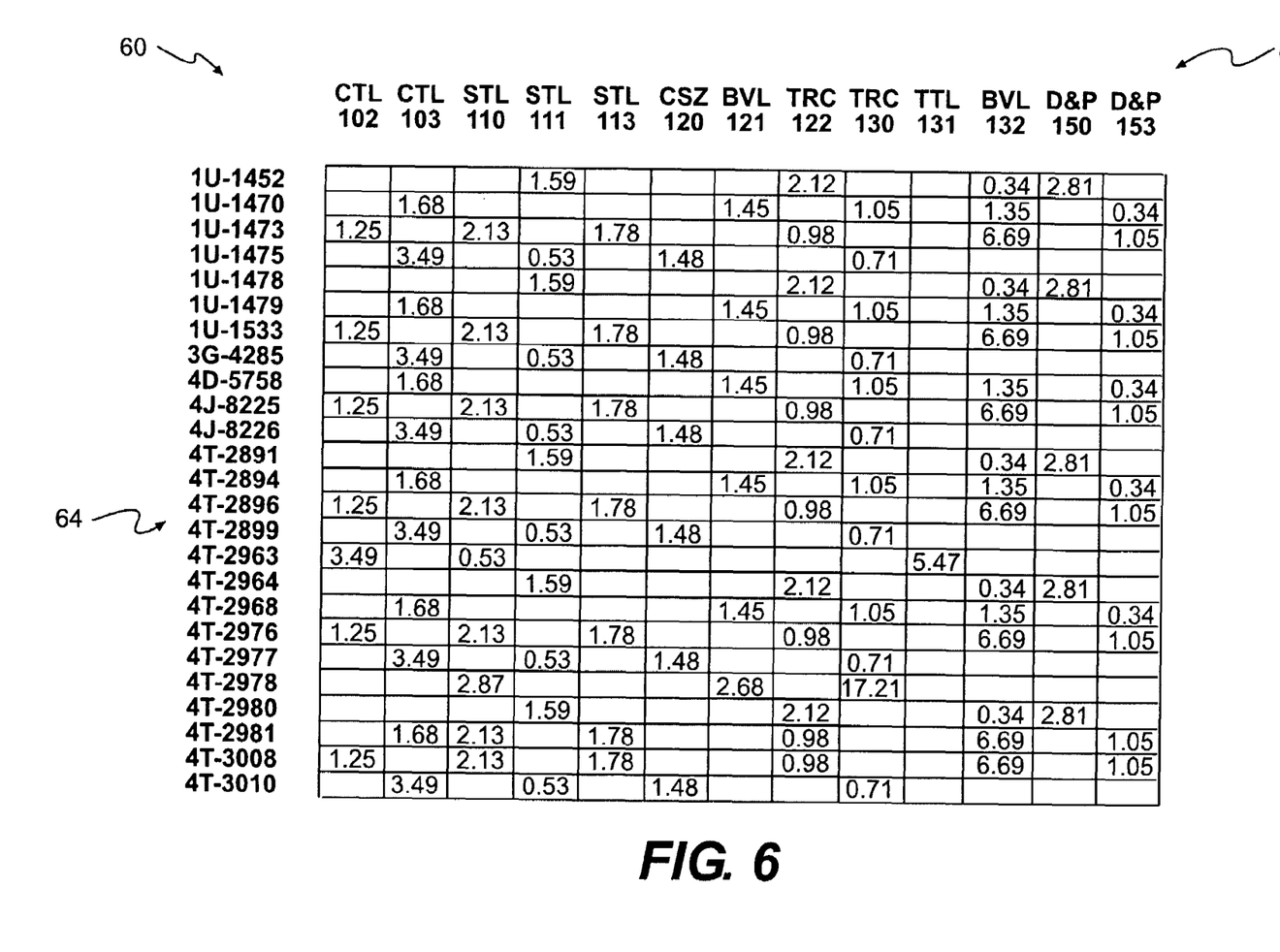
FIG. 6 illustrates a part-process matrix according to an exemplary disclosed embodiment.

FIG. 6 illustrates an exemplary embodiment of a part-process matrix (PPM 60). In some embodiments, PPM 60 may include data identifying one or more manufacturing machines 62 used to produce one or more parts 64. PPM 60 may also include data representing the cycle times to process one or more parts 64 using one or more manufacturing machines 62. For example, it may take 1.59 minutes to process Part 1U-1452 using Machine STL111.

As shown in FIG. 6, families of parts or machines containing similar characteristics may not be readily apparent based on visual inspection of PPM 60. In particular, PPM 60 may not allow a user to discern patterns, or visualize suitable groupings of parts or machines. For example, parts 64 may be listed in PPM 60 based on part number and such a listing may not readily identify parts 64 routed through similar machines 62.

Figure 7:
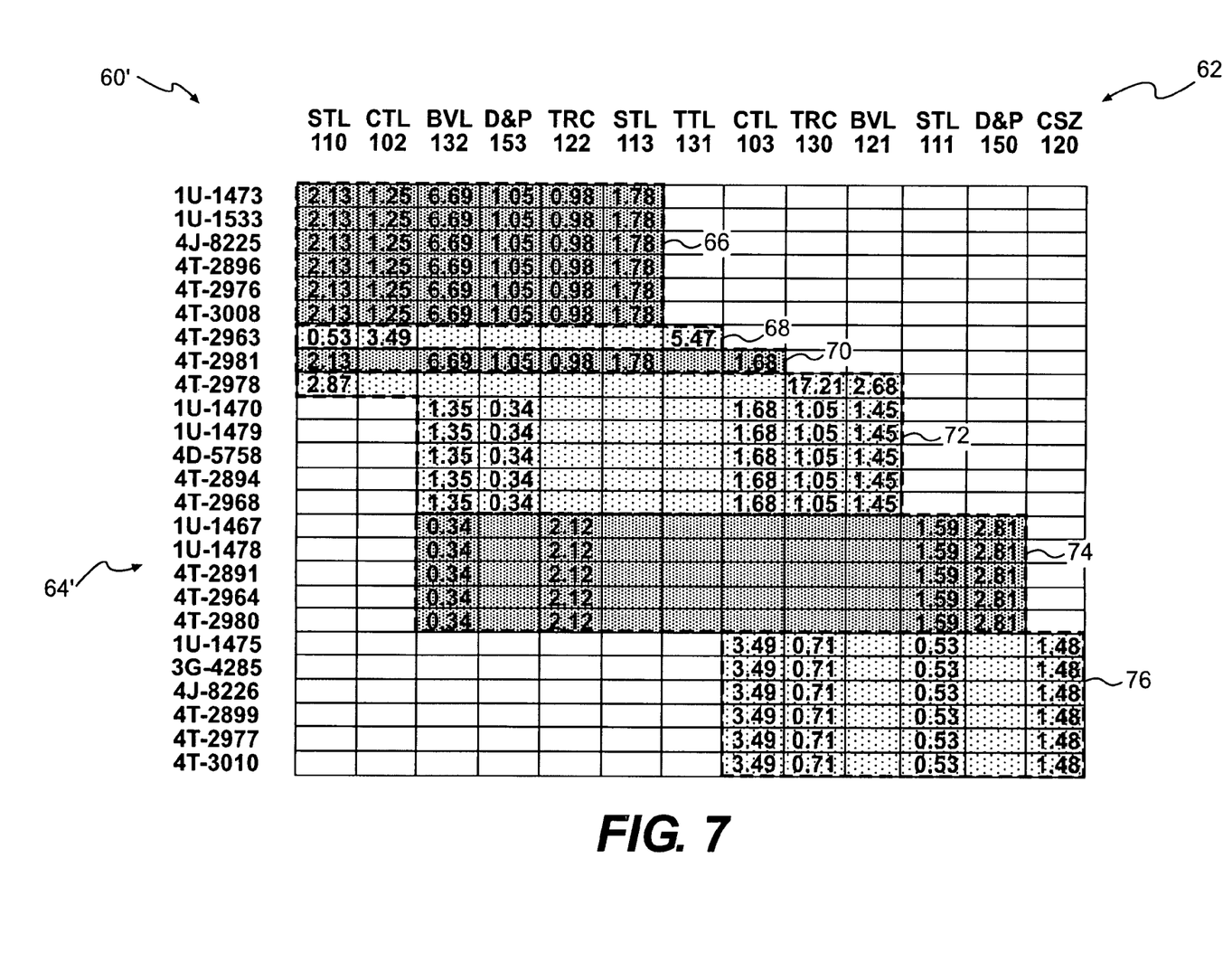
FIG. 7 illustrates a modified part-process matrix according to an exemplary disclosed embodiment.

FIG. 7 illustrates an exemplary embodiment of a modified part-process matrix (PPM 60'). Specifically, PPM 60' shows PPM 60 (FIG. 6) following application of the computational method outlined by flow chart 100 (FIG. 4), wherein PPM 60' may display the data of PPM 60 in a reorganized format. Specifically, the list of parts 64 may be reorganized into sorted parts 64' and the list of machines 62 may be reorganized into sorted machines 62'. As shown in FIG. 7, PPM 60' may display the data of PPM 60 such that families of sorted parts 64' or sorted machines 62' may be more readily identified based on visual inspection of PPM 60'. Following family selection, a user may then analyze the parts and/or machines within each family to improve the efficiency of the one or more processing steps within each family.

As shown in FIG. 7, the data displayed by PPM 60' may be used to identify one or more families of sorted parts 64' or sorted machines 62'. For example, families may include general groupings of sorted parts 64' organized within PPM 60', such as, for example, a family 66, a family 72, a family 74, and a family 76. A family may also include only one member, such as, for example, a family 68 or a family 70. It is also contemplated that a family (not shown) may include general groupings of sorted machines 62'.

In some embodiments, a user may identify families within PPM 60' based on subjective assessment criteria. Specifically, a user may determine families by grouping one or more family members based on the approximate spatial distribution of the one or more family members within PPM 60'. For example, the data of PPM 60' may be grouped into six families 66, 68, 70, 72, 74, and 76 based on the similar positions of the family members. In other embodiments, a user may group family members differently, such as, for example, forming a single family by grouping families 72, 74 and 76.

In other embodiments, a user may define families based on the data contained within the cells. For example, a user may analyze family 72 and determine that the cycle time to produce Part 4T-2978 using Machine TRC130 is greater than the cycle times of the other members of family 72. A user may then decide to remove that member from family 72 in order to reduce the average cycle time for family 72. It is also contemplated that a user may determine families based on machine or part type, part demand, part group, machine location, or any other suitable selection method.

Following the identification of one or more families, the families of mixed-model manufacturing system 10 may be analyzed using any techniques known in the art. For example, a user may use "Best Practice" techniques to analyze one or more families. Best Practice may include analysis of one or more families to determine takt time for each family and compare to the maximum cycle time for each family, Pareto analysis to determine which parts or machines dominate each family, analysis of machine utilization to determine machines with high or low burden, or any other analysis method known in the art.

In some embodiments, one or more cells of PPM 60' may be visually distinguished, such as, for example, by color-coding one or more cells. Specifically, color-coded cells may be used to better distinguish cells of different families. For example, the cells of family 66 may be colored red, and the cells of family 68 may be colored blue to aid visual recognition of different family members.

PPM 60' may be used to identify potential inefficiencies of mixed-model manufacturing system 10. In some embodiments, PPM 60' may allow a user to identify potential problems based on visual assessment. For example, families 68 and 70 each contain a single sorted part 64'. Analysis of family 68 may indicate that Machine TTL131 is used in the manufacture of only one part (Part 4T-2963), and it may be more efficient to remove Machine TTL131 from mixed-model manufacturing system 10. Part 4T-2963 may then be re-routed through one or more different sorted machines 62' or outsourced to a third party to perform the processing step of Machine TTL131. In another example, analysis of family 70 may indicate that Part 4T-2981 is routed through Machine CTL103. However, Part 4T-2981 appears to be routed differently to members of family 66 that are processed using similar sorted machines 62'. It may be more efficient to route Part 4T-2981 through Machine CTL102, similar to sorted parts 64' of family 66. Following, PPM 30' may be reorganized using the method described above and Part 4T-2981 may then be located within family 66. It is also contemplated that additional analysis of PPM 60' may suggest other possible ways to improve the efficiency of mixed-model manufacturing system 10.

INDUSTRIAL APPLICABILITY

The present disclosure provides a system and method for analyzing mixed-model manufacturing operations. The disclosed system and method may be used to improve the manufacture of various parts using a number of manufacturing machines. Mixed-model manufacturing operations may be used to efficiently produce multiple parts using a variety of different machines and processes. During production of a relatively small number of parts with a limited number of machines and production steps, control of mixed-model manufacturing operations can be relatively uncomplicated as inefficiencies may be easy to identify and correct. However, mixed-model manufacturing operations may become less efficient as the numbers of parts produced increases, as manufacturing machines are replaced or upgraded, or as new parts or machines are added to or removed from the manufacturing operation. Further, analysis of the manufacturing operation may be difficult as the identification of inefficient part routings, over-burdened machines, or under-utilized machines may not be readily apparent.

The present disclosure provides a system and method for analyzing mixed-model manufacturing operations. Existing computation methods used to analyze such operations may be limited to a maximum number of parts or machines and/or may run at unacceptably slow speeds on standard computing systems. The computational method disclosed herein may reorganize more parts or machines than existing methods and may run at more acceptable speeds using standard computers.

The presently disclosed systems and methods may be used to improve the overall efficiency of mixed-model manufacturing operations. For example, the disclosed method may allow a user to more easily identify an inefficient part routing, such as, for example, a part routed to a heavily used machine. By diverting parts from a heavily burdened machine to an under-utilized machine, it may be possible to better balance machine utilization and increase the overall efficiency of the mixed-model manufacturing operation.

It will be apparent to those skilled in the art that various modifications and variations can be made to the method and system of the present disclosure. Other embodiments of the method and system will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:

1. A computer readable medium having computer executable instructions for performing a method comprising:
   accessing a part-process matrix containing a plurality of cells, each cell being configured to include data associated with a plurality of parts and a plurality of machines of a mixed-model manufacturing system;
   for each cell, determining whether the cell includes data;
      if a cell is determined to contain data, replacing the data in that cell with a binary value representative of the presence of data in that cell; and
      if a cell is determined not to contain data, inserting into that cell a binary value representative of the absence of data in that cell;
   sorting the plurality of cells according to at least one characteristic associated with the plurality of machines;
   sorting the plurality of cells according to at least one characteristic associated with the plurality of parts;
   for each cell containing the binary value representative of the presence of data in that cell, reinstating the data in that cell; and
   generating a modified part-process matrix containing the sorted plurality of cells.

2. The computer readable medium of claim 1, wherein the method further includes repeating sorting of the plurality of cells according to at least one characteristic associated with the plurality of machines and sorting of the plurality of cells according to at least one characteristic associated with the plurality of parts.

3. The computer readable medium of claim 1, wherein sorting the plurality of cells according to at least one characteristic associated with the plurality of parts and the plurality of machines includes sorting the plurality of cells in ascending order of value of data associated with each cell.

4. The computer readable medium of claim 1, wherein sorting the plurality of cells according to at least one characteristic associated with the plurality of parts and the plurality of machines includes sorting the plurality of cells in descending order of value of data associated with each cell.

5. The computer readable medium of claim 1, wherein generating the modified part-process matrix further includes electronically displaying data associated with each cell using one or more colors.

6. The computer readable medium of claim 1, wherein the method further includes using the modified part-process matrix to determine one or more families from the plurality of parts and the plurality of machines.

7. The computer readable medium of claim 6, wherein the one or more families is analyzed using at least one of takt time, Pareto analysis, and machine utilization.

8. The computer readable medium of claim 1, wherein the data associated with each cell is stored using at least one of a database, a RAM, a ROM, and a storage device.

9. A method for analyzing a mixed-model manufacturing system using a computer system, comprising the computer-implemented steps of:

accessing a part-process matrix containing a plurality of cells, each cell being configured to include data associated with a plurality of parts and a plurality of machines of a mixed-model manufacturing system;

for each cell, determining whether the cell includes data;
if a cell is determined to contain data, replacing the data in that cell with a binary value representative of the presence of data in that cell; and
if a cell is determined not to contain data, inserting into that cell a binary value representative of the absence of data in that cell;

sorting the plurality of cells according to at least one characteristic associated with the plurality of machines;

sorting the plurality of cells according to at least one characteristic associated with the plurality of parts;

for each cell containing the binary value representative of the presence of data in that cell, reinstating the data in that cell; and generating a modified part-process matrix containing the sorted plurality of cells.

10. The method of claim 9, wherein the method further includes repeating sorting the plurality of cells according to at least one characteristic associated with the plurality of machines and sorting the plurality of cells according to at least one characteristic associated with the plurality of parts.

11. The method of claim 9, wherein sorting the plurality of cells according to at least one characteristic associated with the plurality of parts and the plurality of machines includes sorting the plurality of cells in ascending order of value of data associated with each cell.

12. The method of claim 9, wherein sorting the plurality of cells according to at least one characteristic associated with the plurality of parts and the plurality of machines includes sorting the plurality of cells in descending order of value of data associated with each cell.

13. The method of claim 9, wherein generating the modified part-process matrix further includes electronically displaying data associated with each cell using one or more colors.

14. The method of claim 9, wherein the method further includes using the modified part-process matrix to determine one or more families from the plurality of parts and the plurality of machines.

15. The method of claim 14, wherein the one or more families is analyzed using at least one of takt time, Pareto analysis, and machine utilization.

16. The method of claim 9, wherein the data associated with each cell is stored using at least one of a database, a RAM, a ROM, and a storage device.

17. A computer system, comprising:
a console;
an input device; and
a central processing unit configured to:
access a part-process matrix containing a plurality of cells, each cell being configured to include data associated with a plurality of parts and a plurality of machines of a mixed-model manufacturing system;
for each cell, determine whether the cell includes data;
if a cell is determined to contain data, replace the data in that cell with a binary value representative of the presence of data in that cell; and
if a cell is determined not to contain data, insert into that cell a binary value representative of the absence of data in that cell;
sort the plurality of cells according to at least one characteristic associated with the plurality of machines;
sort the plurality of cells according to at least one characteristic associated with the plurality of parts;
for each cell containing the binary value representative of the presence of data in that cell, reinstate the data in that cell; and
generate a modified part-process matrix containing the sorted plurality of cells.

18. The computer system of claim 17, wherein the central processing unit is further configured to repeat the sort of the plurality of cells according to at least one characteristic associated with the plurality of machines and the sort of the plurality of cells according to at least one characteristic associated with the plurality of parts.

19. The computer system of claim 17, wherein the sort of the plurality of cells according to at least one characteristic associated with the plurality of parts and the plurality of machines includes sorting the plurality of cells in ascending order of value of data associated with each cell.

20. The computer system of claim 17, wherein the sort of the plurality of cells according to at least one characteristic associated with the plurality of parts and the plurality of machines includes sorting the plurality of cells in descending order of value of data associated with each cell.

21. The computer system of claim 17, wherein generation of the modified part-process matrix further includes electronically displaying data associated with each cell using one or more colors.

22. The computer system of claim 17, wherein the modified part-process matrix is used to determine one or more families from the plurality of parts and the plurality of machines.

23. The computer system of claim 22, wherein the one or more families is analyzed using at least one of takt time, Pareto analysis, and machine utilization.

24. The computer system of claim 17, wherein the data associated with each cell is stored using at least one of a database, a RAM, a ROM, and a storage device.

* * * * *